United States Patent
Hudson, II et al.

(10) Patent No.: US 7,340,134 B1
(45) Date of Patent: Mar. 4, 2008

(54) FLAME RETARDANT FIBER OPTIC CABLES

(75) Inventors: H. Edward Hudson, II, Conover, NC (US); Samuel Don Navé, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/709,039

(22) Filed: Feb. 21, 2007

(51) Int. Cl.
G02B 6/44 (2006.01)

(52) U.S. Cl. ............... 385/100; 385/109; 385/113; 385/114

(58) Field of Classification Search ............... 385/100, 385/101, 102, 103, 104, 105, 106, 107, 108, 385/109, 110, 111, 113, 141, 114, 112
See application file for complete search history.

(56) References Cited

U.S. PATENT DOCUMENTS

| | | | |
|---|---|---|---|
| 4,322,573 A | 3/1982 | Charlebois | 174/72 R |
| 4,549,093 A | 10/1985 | Severwright | 174/72 R |
| 4,884,863 A | 12/1989 | Throckmorton | 350/96.2 |
| 4,961,623 A | 10/1990 | Midkiff et al. | 350/96.2 |
| 5,042,901 A | 8/1991 | Merriken et al. | 385/135 |
| 5,121,458 A | 6/1992 | Nilsson et al. | 385/100 |
| 5,125,060 A | 6/1992 | Edmundson | 385/100 |
| 5,210,812 A | 5/1993 | Nilsson et al. | 385/100 |
| 5,440,665 A | 8/1995 | Ray et al. | 385/135 |
| 5,528,718 A | 6/1996 | Ray et al. | 385/136 |
| 5,657,413 A | 8/1997 | Ray et al. | 385/139 |
| 5,748,823 A | 5/1998 | Navé | 385/113 |
| 5,778,122 A | 7/1998 | Giebel et al. | 385/55 |
| 5,861,575 A | 1/1999 | Broussard | 174/20 |
| 5,892,870 A | 4/1999 | Fingler et al. | 385/59 |
| RE36,592 E | 2/2000 | Giebel et al. | 385/100 |
| 6,122,424 A | 9/2000 | Bringuier | 385/100 |
| 6,160,939 A * | 12/2000 | Sheu | 385/109 |
| 6,167,178 A | 12/2000 | Navé | 385/103 |
| RE37,028 E | 1/2001 | Cooke et al. | 385/112 |
| 6,301,413 B1 * | 10/2001 | Bringuier | 385/100 |
| 6,542,674 B1 * | 4/2003 | Gimblet | 385/113 |
| 6,621,975 B2 | 9/2003 | Laporte et al. | 385/135 |
| 2005/0203230 A1 * | 9/2005 | Kadakia et al. | 524/406 |
| 2007/0010615 A1 * | 1/2007 | Cogen et al. | 524/515 |

* cited by examiner

Primary Examiner—Brian M. Healy
(74) Attorney, Agent, or Firm—Michael E. Carroll, Jr.

(57) ABSTRACT

Fiber optic cables are disclosed that include at least one optical fiber and a flame-retardant cable jacket. The flame-retardant cable jacket has a cavity wherein the at least one optical fiber is disposed within the cavity. The flame-retardant cable jacket includes one or more flame-retardant additives and the flame-retardant cable jacket is essentially free of a water-soluble component that can dissolve and migrate into the cavity. By way of example, the flame-retardant cable jacket is a polyvinyl chloride (PVC) essentially free of ammonium octamolybdate. Other variations include fiber optic cables having a barrier layer for inhibiting the migration of water into a cable cavity.

22 Claims, 2 Drawing Sheets

FLAME RETARDANT FIBER OPTIC CABLES

FIELD OF THE INVENTION

The present invention relates generally to fiber optic cables. Specifically, the present invention relates to fiber optic cables that are flame-retardant.

BACKGROUND OF THE INVENTION

Fiber optic cables provide high-bandwidth pathways for communication systems and the like. Generally speaking, the fiber optic cable designs are based upon the intended environment for use. By way of example, fiber optic cables used for outdoor environments typically have a water-blocking mechanism for inhibiting the migration of water along the cable and suitable low-temperature performance. Whereas, indoor cables typically have flame-retardant characteristics for meeting indoor requirements. Additionally, some fiber optic cables are designed for meeting both water-blocking and flame-retardant characteristics.

Outdoor fiber optic cables typically include a polymer cable jacket such as polypropylene or polyethylene that acts as an environmental barrier for providing protection for the cable core within the cable jacket. However, the polymer cable jackets used for outdoor applications typically are not suitable for meeting indoor flame-retardant requirements such as general-purpose, riser, plenum, or the like. In other words, using polypropylene or polyethylene without modification for the cable jacket typically prevents it from passing the flame-rating test. Moreover, one or more of the cable core components such as buffer tubes, thixotropic greases or gels, optical fiber ribbons, and the like may have a relatively high fuel-loading characteristic that add to the difficulty in meeting flame-retardant ratings.

One approach for meeting flame-retardant ratings is using special blends of cable jacket materials, thereby making them flame-retardant. For instance, fiber optic cables having flame-retardant ratings might use an outdoor cable jacket material having one or more flame-inhibiting additives. Additionally, flame-retardant fiber optic cables may also use other cable components such as special tapes or the like that act as a flame barrier or char forming layer, thereby helping meet the desired flame-retardant requirements.

Illustratively, a flame-retardant polyethylene (FRPE) or flame-retardant polypropylene (FRPP) can include one or more inorganic additives for flame-inhibiting, smoke suppression, or the like. For example, suitable flame-inhibiting additives include aluminum trihydrate, metal hydroxides, or the like that are blended into the polyethylene or polypropylene for producing a flame-retardant polymer. However, using relatively high-levels of flame-inhibiting additives within the cable jacket polymer or other cable components adds considerable expense to the material and hence the fiber optic cable, thereby making their cost prohibitive.

Another approach for meeting flame-retardant ratings is using materials that are inherently flame-retardant. By way of example, highly-filled polymers such as polyvinyl chloride (PVC) are inherently flame-retardant and used because of their characteristics when burned (i.e., they have intumescent characteristics and excellent char performance). Pure PVCs are inherently flame-retardant because of their high chlorine content. However, PVCs also require additives for use in fiber optic cables that can undermine their flame-retardant characteristics. For instance, PVCs must typically include one or more plasticizers since pure PVCs are relatively stiff materials and the fiber optic cables must be able to bend relatively easily for routing, storage, and the like. These plasticizers are flammable so a balance between the competing characteristics of flame-retardancy and flexibility must be achieved while still being economical for production.

Another level of complexity is added when fiber optic cables must also provide water-blocking features in addition to flame-retardant characteristics. For instance, if a thixotropic grease or gel is used for water-blocking it acts to increase the fuel loading for the fiber optic cable, thereby making it more difficult to meet burn requirements. Additionally, the fiber optic cable must also be able to withstand long-term exposure to water. Thus, there has been a long-felt need for fiber optic cable designs that are suitable for meeting all of the required performance characteristics while still being economical for production.

SUMMARY OF THE INVENTION

Fiber optic cables are disclosed that include at least one optical fiber and a flame-retardant cable jacket. The flame-retardant cable jacket has a cavity wherein the at least one optical fiber is disposed within the cavity. The flame-retardant cable jacket includes one or more flame-retardant additives and the flame-retardant cable jacket is essentially free of a water-soluble component that can dissolve and migrate into the cavity. By way of example, the flame-retardant cable jacket is a polyvinyl chloride (PVC) essentially free of ammonium octamolybdate.

Another aspect of the present invention is directed to a fiber optic cable having at least one optical fiber and a flame-retardant cable jacket. The flame-retardant cable jacket has a cavity with the one optical fiber is disposed therein. The flame-retardant cable jacket includes a first layer and a water-barrier layer. The first layer is formed of a polyvinyl chloride and the barrier layer is a material that inhibits water from reaching the cavity.

Still another aspect of the present invention is a fiber optic cable having at least one optical fiber and a flame-retardant cable jacket. The flame-retardant cable jacket has a cavity having the optical fiber disposed therein. The flame-retardant cable includes a barrier layer for inhibiting water from penetrating to the cavity when exposed to a long-term water exposure.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Figure 1:
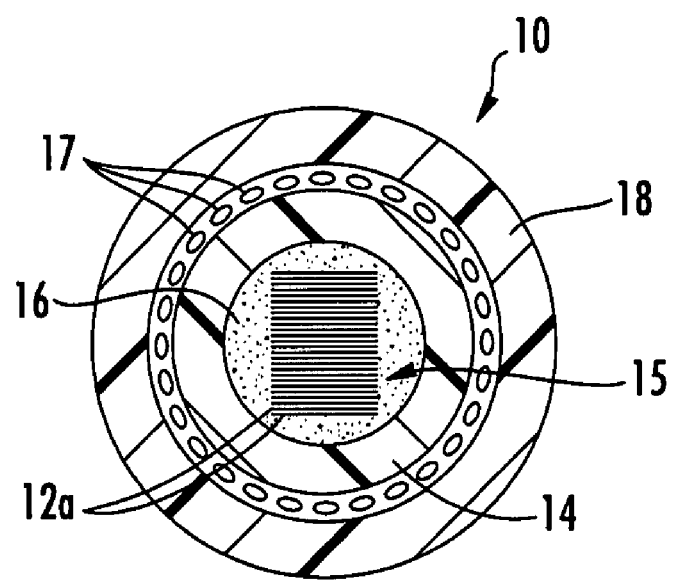
FIG. 1 depicts a cross-sectional view of a fiber optic cable according to the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 1 depicts a fiber optic cable 10 according to the present invention. Fiber optic cable 10 includes at least one optical fiber 12 and a flame-retardant cable jacket 18 that meets a flame-retardant rating such as general purpose, riser, plenum, or the like. Flame-retardant cable jacket 18 has a cavity 15 and one or more optical fibers 12 as individual optical fibers, ribbons, or the like disposed within cavity 15. More specifically, flame-retardant cable jacket 18 includes one or more additives as components blended into the polymer as a flame-retardant, smoke retardant, processing aid, or the like. Specifically, flame-retardant cable jacket 18 is essentially free of additives that are water-soluble under long-term exposure to water, thereby inhibiting dissolving of the additives and, thus, inhibiting the leaching of water-soluble additives into cavity 15 of flame-retardant cable jacket 18. Long-term exposure to water means subjecting the cable to water for a period one or more years. Likewise, other cable components such as tubes housing optical fibers or the like are essentially free of additives that are water-soluble under long-term exposure to water, thereby inhibiting dissolving of the additives. Additionally, inhibiting the leaching of additives within the cable also aids in preserving the performance for water-swellable components within the same.

The present invention is advantageous because it has been discovered that long-term exposure of a conventional flame-retardant cable jacket to liquids can cause some flame-retardant additives to leach out of the cable jacket and undesirably migrate into a cavity of the cable jacket. By way of example, PVCs are highly filled materials, thereby making them porous and susceptible to water-penetration and/or absorption. Moreover, as the water penetrates the cable jacket and is absorbed it may swell. During long-term exposure to liquids such as water, a conventional fiber optic cable having a flame-retardant PVC cable jacket can allow water to migrate into the cable jacket and dissolve one or more additives in the flame-retardant cable jacket that are water-soluble, thereby allowing the dissolved additives to leach into the cavity of the cable jacket with the water. Moreover, if components of the additives dissolve into the liquid as cations (i.e., have valances such as +1, +2, etc.) such as sodium, potassium, magnesium, calcium, aluminum, beryllium, molybdenum, etc. then the water that migrates into the cavity is ionic and may severely reduces the effectiveness of the water-swellable components such as tapes, yarns, or powders. Consequently, the conventional fiber optic cable loses effectiveness for blocking the migration of liquids such as water along the fiber optic cable. The concepts of the present invention inhibit leaching of additives out of the flame-retardant cable jacket and into the cavity thereof.

One solution for meeting the desired flame-rating and long-term water exposure according to the present invention is using additives in the flame-retardant cable jacket that are inhibited from dissolving and leaching out of the same. In other words, the additives are bonded with the polymer of the flame-retardant cable jacket. The mechanism for bonding the additives within the polymer of the cable jacket are intercalation (i.e., trapping the additive in the polymer) in the polymer matrix, chemical, or otherwise. By example, the flame-retardant cable jacket is a PVC that is essentially free of an additive that is soluble such as ammonium octamolybdate that can leach out under exposure to long-term water. The flame-retardant cable jacket such as the PVC or other material may also include one or more plasticizers for inhibiting water-absorption into the same. Likewise, the flame-retardant cable jacket may also have a low-smoke zero-halogen rating.

Specifically, fiber optic cable 10 includes optical fiber 12 that is a portion of a fiber optic ribbon 12a that is part of a ribbon stack (not numbered). For instance, the ribbon stack may include eighteen ribbons each having twelve optical fibers for a total of 216 optical fibers within fiber optic cable 10, but other optical fiber counts are possible. Also disposed within tube 14 is at least one water-blocking component 16 such as a thixotropic grease or gel, but other water-blocking components such as a water-swellable yarn, water-swellable thread, a water-swellable tape, a water-swellable powder, a dry insert, or the like. Tube 14 is formed from any suitable material such as a PVC, PVDF, PE, FRPE, PP, FRPP, or the like and is surrounded by a plurality of strength members. More specifically, the strength members are a flexible rovings such as aramid or fiberglass that are counter-helically disposed about tube 14. Additionally, the strength members may include a water-swellable substance for blocking the migration of water along the fiber optic cable.

Figure 2:
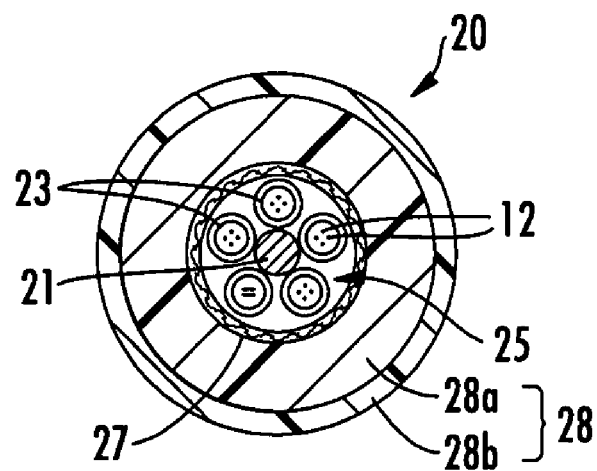
FIG. 2 depicts a cross-sectional view of another fiber optic cable according to the present invention.

Other fiber optic cable constructions may also provide similar performance for inhibiting the leaching of additives out of the cable jacket and into the cable core defined by the cable jacket cavity. By way of example, FIG. 2 depicts a fiber optic cable 20 having at least one optical fiber 12 disposed within a cavity 25 of a flame-retardant cable jacket 28. In this fiber optic cable, flame-retardant cable jacket 28 includes a first layer 28a and a barrier layer 28b for inhibiting water from penetrating into cavity 25. For instance, first layer 28a is a polyvinyl chloride (PVC) and barrier layer 28b is a polymer material that inhibits water from penetrating the barrier layer 28b and entering cavity 25. Advantageously, barrier layer 28b is disposed radially outward of first layer 28a and inhibits water from passing therethrough; however, the barrier layer may be disposed radially inward of the first layer. If barrier layer 28b is disposed radially inward of first layer 28a, then the additives of the first layer need not be essentially free of water-soluble components since the water is inhibited from penetrating into cavity 25. If the barrier layer is radially inward of fiber layer, then the layers will preferably have a degree of bonding therebetween for inhibiting water to travel between the layers.

Generally speaking, suitable materials for barrier layer 28b are non-porous for inhibiting the transmission of water therethrough. Suitable materials for barrier layer include a fluoropolymer layer such as polyvinylidene fluoride (PVDF), a polyester layer, a polyethylene layer, a polyolefin layer, a polytetrafluoroethylene (PTFE), or the like. Optionally, first layer 28a of this construction of FIG. 2 is essentially free of water-soluble components that can dissolve and migrate into cavity 25. Additionally, barrier layer 28b and first layer 28a should be suitably bonded together for inhibiting water from migrating therebetween. FIG. 2 also depicts a different type of cable core from fiber optic cable 10. Specifically, the cable core is a loose tube cable design having a plurality of tubes 23 stranded about a central member 21. Tubes 23 may include any suitable type of optical fibers such as ribbon, loose, bundles, or the like. Fiber optic cable 20 can also include other optional components such as a water-swellable component, a char tape, ripcords, armor, filler rods, or the like. For instance, one or more water-swellable yarns may be wrapped about central member 21 and a water-swellable tape or char tape 27 can be disposed about the plurality of tubes.

Figure 3:
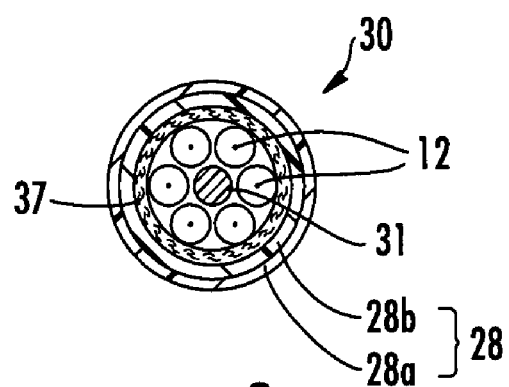
FIG. 3 depicts a cross-sectional view of another fiber optic cable according to the present invention.

Of course, the concepts of the invention are useful in other variations such as having the barrier layer disposed radially inward of a portion of the cable jacket. By way of example, FIG. 3 depicts a cross-sectional view of another fiber optic cable 30 according to the present invention where barrier layer 28b is radially inward of first layer 28a. Fiber optic cable 30 has a cable core that includes a plurality of buffered optical fibers stranded about a central member 31. Although, six optical fibers 12 are depicted different optical fibers counts are possible. The cable core also includes a water-swellable tape 37 for blocking the migration of water along the cable and a ripcord (not visible). Other variations are possible such as strength members or other cable components.

Figure 4:
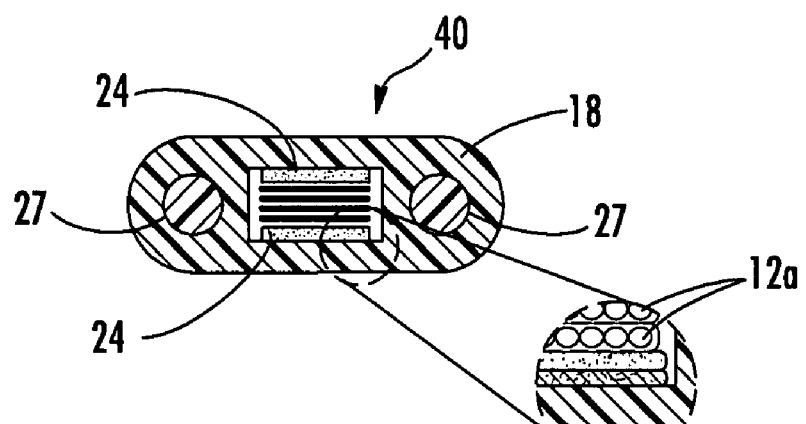
FIG. 4 depicts still another cross-sectional view of a fiber optic cable according to the present invention.

The concepts of the present invention are also useful with non-round fiber optic cables. FIG. 4 depicts still another cross-sectional view of a fiber optic cable 40. Fiber optic cable 40 includes cable jacket 18 as described above that is essentially free of an additive that is soluble and can leach out under long-term exposure to water. Fiber optic cable 40 is a tubeless design having one or more fiber optic ribbons 12a sandwiched between a first dry insert 24 and a second dry insert 24 within the cable cavity (not numbered), thereby providing a degree of coupling of the fiber optic ribbon to cable jacket 18 with a dry cable design. By way of example, dry insert 24 is a longitudinal foam tape that may include a water-swellable layer attached thereto (as depicted) or otherwise disposed within the cable cavity as a separate component. Additionally, other types of dry inserts are possible such as dimensional fabrics, felt-like materials, or the like. Fiber optic cable 40 also includes a pair of strength members 27 disposed on opposite side of the cavity for providing tensile strength. Fiber optic cable 40 can also include other cable components such as armor, a char tape, water-blocking materials, or other suitable cable components.

Figure 5:
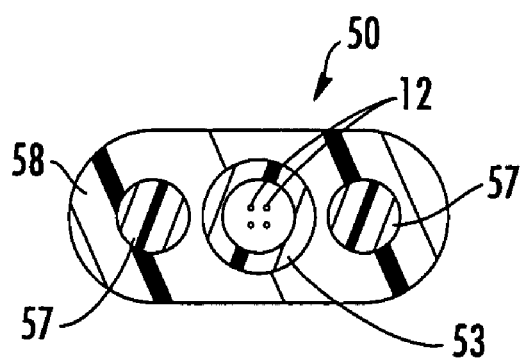
FIG. 5 depicts still another cross-sectional view of a fiber optic cable according to the present invention.

Other cable designs are also possible using the barrier layer to inhibit the leaching into a cable cavity. Illustratively, FIG. 5 depicts a cross-sectional view of a fiber optic cable 50 using the barrier layer. Fiber optic cable 50 includes a tube 53 having optical fibers 12 therein along with a water-blocking component such as a thixotropic grease or gel. Disposed on opposite sides of tube 53 are strength members 57 and a cable jacket 58 is applied thereover. In fiber optic cable 50, the barrier layer can be either tube 53 or cable jacket 58. In other words, tube 53 can be a barrier layer with a suitable material such as PVDF and cable jacket 58 is the first layer such as a PVC material. Another variation is to use cable jacket 58 as the barrier layer and tube 53 as the first layer. Thus, the concepts of the present invention are applicable to a variety of fiber optic cable designs.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic cable comprising:
   at least one optical fiber; and
   a flame-retardant cable jacket, the flame-retardant cable jacket having a cavity wherein the at least one optical fiber is disposed within the cavity, wherein the flame-retardant cable jacket includes one or more flame-retardant additives and the flame-retardant cable jacket is essentially free of a water-soluble component that can dissolve and migrate into the cavity.

2. The fiber optic cable of claim 1, wherein the flame-retardant cable jacket is a polyvinyl chloride essentially free of ammonium octamolybdate.

3. The fiber optic cable of claim 1, wherein the one or more flame-retardant additives are bound to the flame-retardant cable jacket so they are inhibited from dissolving and leaching out of the flame-retardant cable jacket.

4. The fiber optic cable of claim 1, further including a cable component selected from the group of a barrier layer for inhibiting the migration of water into the cavity, a water-swellable component, a char tape, a dry insert, a strength member, a ripcord, and an armor layer.

5. The fiber optic cable of claim 1, wherein the at least one optical fiber is a portion of a fiber optic ribbon.

6. The fiber optic cable of claim 1, the flame-retardant cable jacket including at least one plasticizer for inhibiting water-absorption.

7. The fiber optic cable of claim 1, further including a flame-retardant tube wherein the at least one optical fiber is disposed within the flame-retardant tube and the flame-retardant tube includes one or more flame-retardant additives that are essentially free of a water-soluble component that can dissolve and migrate into the flame-retardant tube.

8. The fiber optic cable of claim 1, further including a tube wherein the at least one optical fiber is disposed within the tube along with at least one water-blocking component.

9. The fiber optic cable of claim 1, wherein the flame-retardant cable jacket also has a low-smoke zero-halogen rating.

10. A fiber optic cable comprising:
    at least one optical fiber; and
    a flame-retardant cable jacket, the flame-retardant cable jacket having a cavity wherein the at least one optical fiber is disposed within the cavity, wherein the flame-retardant cable jacket includes a first layer and a barrier layer, wherein the first layer is formed of a polyvinyl chloride having one or more flame-retardant additives that are essentially bound to the first layer so they are inhibited from dissolving and leaching out and the barrier layer is a material that inhibits water from reaching the cavity.

11. The fiber optic cable of claim 10, wherein the first layer of the flame-retardant cable jacket is formed of a polyvinyl chloride that is essentially free of water-soluble components that can dissolve and migrate into the cavity and the barrier layer of the flame-retardant cable jacket is formed from a fluoropolymer.

12. The fiber optic cable of claim 10, wherein the barrier layer is selected from the group of a polytetrafluoroethylene, a fluoropolymer, a polyester, a polyethylene, and a polyolefin.

13. The fiber optic cable of claim 10, further including a cable component selected from the group of a water-swellable component, a char tape, a dry insert, a strength member, a ripcord, and an armor layer.

14. The fiber optic cable of claim 10, wherein the at least one optical fiber is a portion of a fiber optic ribbon.

15. The fiber optic cable of claim 10, the flame-retardant cable jacket including at least one plasticizer for inhibiting water-absorption.

16. The fiber optic cable of claim 10, further including a flame-retardant tube wherein the at least one optical fiber is disposed within the flame-retardant tube and the flame-retardant tube includes one or more flame-retardant additives that are essentially free of a water-soluble component that can dissolve and migrate into the flame-retardant tube.

17. The fiber optic cable of claim 10, further including a tube wherein the at least one optical fiber is disposed within the tube along with at least one water-blocking component.

18. The fiber optic cable of claim 10, wherein the flame-retardant cable jacket also has a low-smoke zero-halogen rating.

19. A fiber optic cable comprising:
at least one optical fiber; and
a flame-retardant cable jacket, the flame-retardant cable jacket having a cavity wherein the at least one optical fiber is disposed within the cavity, wherein the flame-retardant cable includes a barrier layer for inhibiting water from penetrating to the cavity when exposed to a long-term water exposure and the flame-retardant cable jacket includes at least one plasticizer for inhibiting water-absorption.

20. The fiber optic cable of claim 19, wherein the barrier layer of the flame-retardant cable jacket is selected from the group of a polytetrafluoroethylene, a fluoropolymer, a polyester, a polyethylene, and a polyolefin.

21. The fiber optic cable of claim 19, further including a cable component selected from the group of a water-swellable component, a char tape, a strength member, a ripcord, and an armor layer.

22. The fiber optic cable of claim 19, further including a tube wherein the at least one optical fiber is disposed within the tube along with at least one water-blocking component.

* * * * *